United States Patent [19]

Holladay et al.

[11] 4,162,298

[45] Jul. 24, 1979

[54] METHOD OF IMMOBILIZING CARBON DIOXIDE FROM GAS STREAMS

[75] Inventors: David W. Holladay, Knoxville; Gary L. Haag, Oliver Springs, both of Tenn.

[73] Assignee: The United States of America as represented by the United States Department of Energy, Washington, D.C.

[21] Appl. No.: 932,152

[22] Filed: Aug. 9, 1978

[51] Int. Cl.$^2$ ............................................. B01D 53/34
[52] U.S. Cl. .................................... 423/230; 423/239; 423/241; 176/37; 252/301.1 W
[58] Field of Search ............... 423/230, 231, 241, 239, 423/395, 432, 497; 252/189, 190, 301.1 W; 176/37

[56] References Cited

U.S. PATENT DOCUMENTS

| | | | |
|---|---|---|---|
| 3,847,837 | 11/1974 | Boryta | 423/230 X |
| 4,039,620 | 8/1977 | Nettleland | 423/230 |

OTHER PUBLICATIONS

Mellor, "A Comprehensive Treatise on Inorganic & Theoretical Chemistry", Longman, Green & Co., N.Y., vol. III, p. 817, 1923.
Scheibler, "Ueber das Verhalten der Alkalischen Erden und Deren Hydrate gegen Troiken Kohlensaure", Berichte Chemiche, vol. No. 19, 1886, pp. 1973-1982.
Swanson, "Literature Survey: Reaction of $CO_2$ with Solid CaO", Allied Chemical Company, Oct. 12, 1976.
Adriani et al., "The Efficiency of Mixtures of Barium and Calcium Hydroxides in the Absorption of Carbon Dioxide in Rebreathing Appliances," Anesthesiology, vol. 3, No. 1, Jan. 1942, pp. 1-10.
Batten et al., "Clinical and Experimental Studies of Barium and Calcium Hydroxides Mixtures (Baralyme) for Carbon Dioxide Absorption in Anesthesia", Anesthesia and Analgesia, vol. 21, 1942, pp. 151-158, Chemical Abstracts, vol. 36, 4600.

Primary Examiner—Earl C. Thomas
Attorney, Agent, or Firm—Dean E. Carlson; Stephen D. Hamel; Fred O. Lewis

[57] ABSTRACT

This invention is a method for rapidly and continuously immobilizing carbon dioxide contained in various industrial off-gas streams, the carbon dioxide being immobilized as dry, stable, and substantially water-insoluble particulates. Briefly, the method comprises passing the gas stream through a fixed or fluidized bed of hydrated barium hydroxide to remove and immobilize the carbon dioxide by converting the bed to barium carbonate. The method has several important advantages: it can be conducted effectively at ambient temperature; it provides a very rapid reaction rate over a wide range of carbon dioxide concentrations; it provides high decontamination factors; and it has a high capacity for carbon dioxide.

The invention is especially well suited for the removal of radioactive carbon dioxide from off-gases generated by nuclear-fuel reprocessing facilities and nuclear power plants.

10 Claims, 8 Drawing Figures

METHOD OF IMMOBILIZING CARBON DIOXIDE FROM GAS STREAMS

BACKGROUND OF THE INVENTION

This invention was made in the course of, or under, a contract with the U.S. Department of Energy.

The invention relates generally to dry processes for removing carbon dioxide from industrial off-gas streams. The invention is especially well-suited for immobilizing radioactive carbon dioxide present in waste gas generated by nuclear power plants, nuclear-fuel reprocessing plants, and the like, the carbon dioxide being immobilized in a form suitable for long-term storage.

There is growing concern that carbon-14 may constitute a significant radiological hazard in the gaseous effluent, or off-gas, from a nuclear facility, such as a nuclear power plant or a nuclear fuel reprocessing plant. For example, in a proposed facility for reprocessing fuel from a light-water reactor (LWR), the off-gas would be a stream consisting of air containing $CO_2$ in a concentration in the range of from about 0.03 to 1.0%. (The concentration of $CO_2$ in ambient air is about 0.033%, or 330 ppm.) Part of the $CO_2$ in the off-gas would comprise radioactive carbon-14, owing to neutron reactions with isotopes of elements present in the LWR cooling water, fuel, and structural materials. Thus, in this instance and in the case of certain other nuclear facilities as well, there is a pressing need for an efficient, convenient, and relatively inexpensive process capable of (1) removing as much as possible of the radioactive carbon dioxide from the off-gas and (2) immobilizing the removed carbon dioxide in a compact form well suited for long-term storage.

PRIOR ART

The literature includes laboratory-scale experiments in which $Ba(OH)_2.H_2O$ and $Ba(OH)_2.8H_2O$ were used to absorb $CO_2$ from dry or moist air, the reaction [e.g. $Ba(OH)_2 + CO_2 \rightarrow BaCO_3 + H_2O$] taking place more rapidly with the moist air. The medical literature reports the use of "baralyme" pellets to absorb $CO_2$ from exhaled breath, these pellets consisting of 20 parts $Ba(OH)_2.8H_2O$ and 80 parts $Ca(OH)_2$. Carbon dioxide has been removed from air by directing the air through continuously stirred aqueous slurries of either $Ca(OH)_2$ or $Ba(OH)_2$, the latter being preferred from the standpoint of reactivity with $CO_2$. Unfortunately, the power required to agitate the slurries effectively is very large, and the carbon dioxide is not immobilized in compact, dry form. The use of particulate CaO to absorb $CO_2$ is reported to require heat and pressure, and it is rendered difficult and expensive by the formation of a diffusion-restricting film of carbonate on the CaO. The reaction of $CO_2$ and lime is described in various publications, as in the following report: R. R. Swanson, "Literature Survey: Reaction of $CO_2$ with Solid CaO," Allied Chemical Corporation, Oct. 12, 1976.

OBJECTS OF THE INVENTION

Accordingly, it is an object of this invention to provide a novel process for disposing of fission-product radioactive carbon dioxide contained in the off-gas from a nuclear facility.

It is another object to provide an industrially practical process for immobilizing radioactive or non-radioactive carbon dioxide from an off-gas containing the same, the carbon dioxide being immobilized in dry, stable, and substantially water-insoluble form.

It is another object to provide a method for rapidly scrubbing carbon dioxide from an off-gas stream, said method permitting the use of comparatively small fixed or fluidized beds for immobilizing the carbon dioxide.

Other objects will be made apparent hereinafter.

SUMMARY OF THE INVENTION

In the operation of a facility which generates an off-gas including carbon dioxide containing fission-product radioactive carbon as a constituent, the improvement comprising removing said carbon dioxide and immobilizing the same in dry, stable, and substantially water-insoluble form by directing said off-gas through a bed of particulate hydrated barium hydroxide while continuously introducing water vapor to said bed in an amount in the range of from 1 to 100% of the saturation value for said off-gas to convert at least 75% of said hydroxide to barium carbonate.

BRIEF DESCRIPTION OF THE DRAWINGS

In FIGS. 2-8, "DF" represents "Decontamination Factor" (moles rate $CO_2$ in/moles rate $CO_2$ out).

DESCRIPTION OF THE PREFERRED EMBODIMENT

Figure 1:
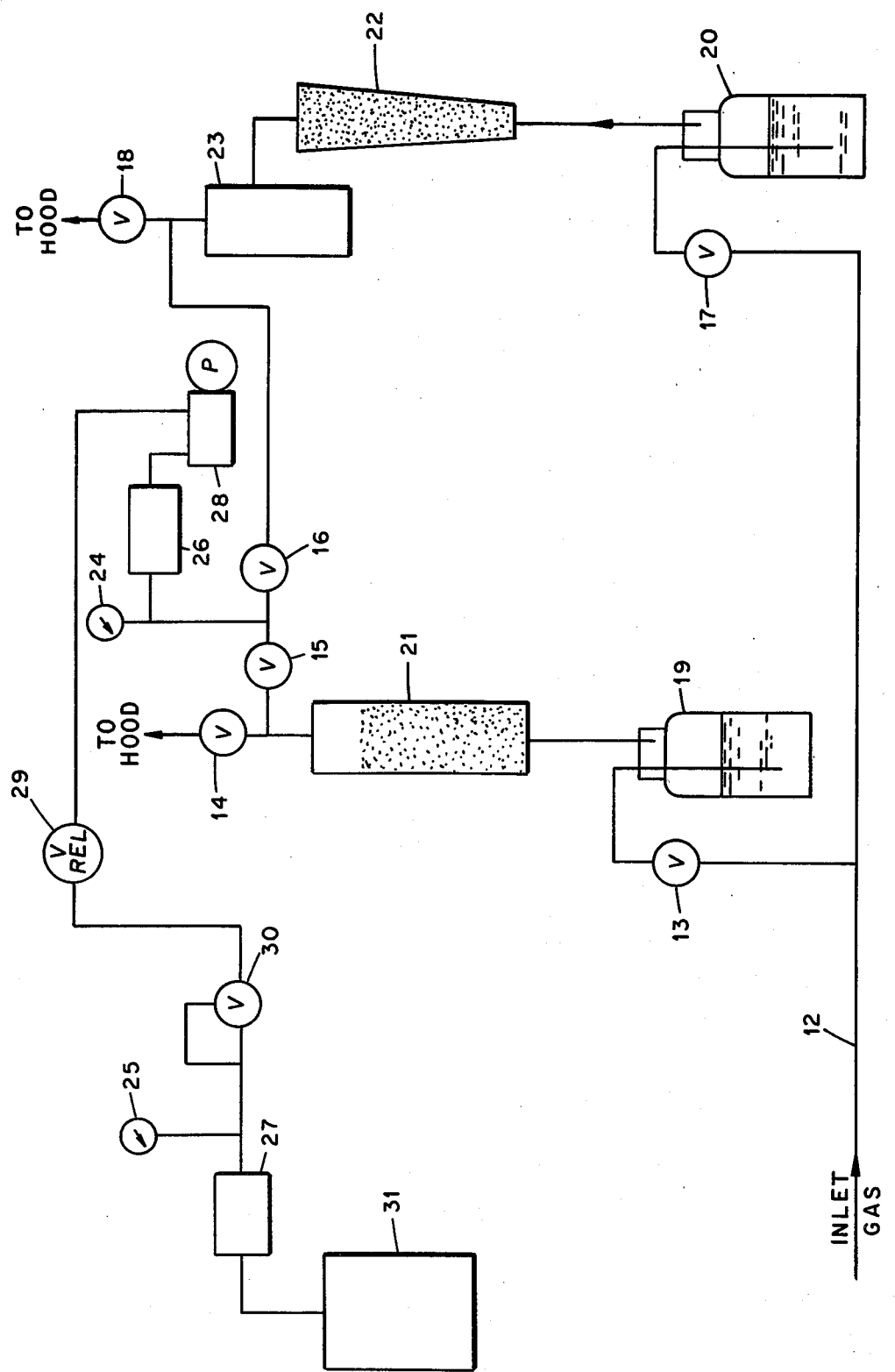
FIG. 1 is a schematic diagram of apparatus for practicing this invention in a fixed-bed mode or a fluidized-bed mode.

Our process is generally suitable for the removal of carbon dioxide from gas streams, but for brevity it will be illustrated below chiefly as employed for the disposal of carbon dioxide from an air stream.

Our process is based on our finding that beds of selected hydrated barium hydroxides are highly effective for the continuous removal of carbon dioxide from gas streams in the presence of water vapor. We have found that with proper selection of process variables, the reaction with carbon dioxide is very rapid—even at room temperature—and that the extent of bed conversion to barium carbonate can be very high. In some of our runs we have achieved essentially 99% conversion of the bed to $BaCO_3$—a highly desirable feature for applications where radioactive carbon dioxide is to be immobilized, since ideally 100% of the used bed material should be in the highly insoluble stable carbonate form to ensure long-term immobilization. We have found that under selected reaction conditions the hydrated barium hydroxides have a very high capacity for carbon dioxide. For instance, a packed bed of 190 grams of the monohydrate [$Ba(OH)_2.H_2O$] will absorb about 22 liters of $CO_2$ from a water-saturated stream of air at room temperature. In short, we believe that we are the first to find that the kinetics for carbon dioxide and selected hydrated barium hydroxides are highly favorable for industrial applications such as as the immobilization of carbon dioxide from the off-gas streams from nuclear or fossil-fuel facilities.

The following are the major advantages of our process for using beds of barium hydroxide hydrates to remove $CO_2$ from gas streams. (1) The process avoids difficulties associated with liquid pumping and handling; such difficulties are especially objectionable where radionuclides are present in the feed gas. (2) The product is a solid which has very favorable properties for maintenance of stability in long-term storage. (3) An especially important advantage is that the removal reaction can be conducted at relatively low temperatures in the range of from ambient to about 105° C. (4) The process provides an extremely high removal efficiency (>0.999) for $CO_2$ in air streams containing 0.03% to 3% $CO_2$ at ambient conditions. (5) We have found that if a suitable amount of water vapor is provided continuously to the reaction zone, the conversion of $Ba(OH)_2$ to $BaCO_3$ can be maximized, significantly extending the useful life of the bed. (6) Preliminary studies indicate that the process is much more economical than competitive processes.

In the following $CO_2$-sorption examples, commercial-grade hydrated barium hydroxide powders were employed. The powders were obtained from two sources, designated herein as sources 1 and 2. The $Ba(OH)_2 \cdot 8H_2O$ (from source 1) was dried to remove unevaporated water from the manufacturing process (not waters of hydration). The particle size distribution of the dried powder was as follows in terms of Tyler mesh size and percent of solids: +4—10.8%; +8—33%; +20—54%; +50—2.6%. The $Ba(OH)_2 \cdot H_2O$ (from source 2) did not require drying. Its corresponding particle size distribution was +4—0.4%; +8—5.2%; +20—33.4%; +50—35.1%; +120—9.9%; +200—4.6%; −200—5.2%.

In the following examples, the calculations of the decontamination factors (DF=mole rate $CO_2$ in/mole rate $CO_2$ out) were based on measurements made by one or more of the following techniques: (a) gas chromatography (GC) followed by thermal conductivity detection (TCD), lower limit for $CO_2$, ~10 ppm; (b) gas chromatography followed by flame ionization detection (FID), lower limit for $CO_2$, ~0.1 ppm; (c) infrared spectroscopy lower limit for $CO_2$, ~1.0 ppm. In all of the examples, the extent of bed conversion to $BaCO_3$ was determined by the Kolthoff-Sandell technique for titration of hydroxyl species in the presence of carbonates. [I. M. Kolthoff, et al, *Textbook of Qualitative Inorganic Analyses*, MacMillian Co., New York (1948)]. Unless otherwise stated, gas-residence times for the fixed-bed runs are based on a bed void volume of 0.60.

FIG. 1 is a schematic diagram of an experimental apparatus for the removal of $CO_2$ in accordance with this invention from $CO_2$-enriched air. As shown, the apparatus included a line 12 for admitting a feed gas at above-atmospheric pressure, various block valves 13–18, conventional humidifiers 19 and 20 for maintaining the relative humidity of the feed gas at selected values, a fixed-bed contactor 21, a tapered-bed contactor 22, a standard cyclone separator 23 for removing particulates from the effluent from contactor 22, pressure indicators 24 and 25, gas filters 26 and 27, a bellows pump 28, a pressure-relief valve 29, a pressure-regulating valve 30, and a conventional $CO_2$ analyzer 31. With valves 13–15 open and valves 16–18 closed, the arrangement operated as a fixed-bed system whose effluent was vented through valve 14. A sample of the effluent flowed into the system 24–31 for analysis. With valves 13–15 closed and valves 16–18 open, the arrangement operated as a fluidized-bed system a sample of whose effluent was analyzed in system 24–31. Bellows pump 28 was provided to maintain the sampling system downstream thereof at above-atmospheric pressure. Valve 30 was set to reduce the sample pressure to a value compatible with the analyzer, e.g., to 5 psig.

EXAMPLE 1 (Run 02167851)

The following table summarizes a typical experimental run conducted with the apparatus of FIG. 1 in the fixed-bed mode.

Feed gas: water-saturated air; total $CO_2$ content, 4.5%
Average flow rate of feed gas: 4.8 l/min.
Temperature of feed gas: 20° C.
Fixed-bed material: $Ba(OH)_2 \cdot H_2O$ (Source 2)
Dimensions of bed: 2.54×55 cm. (1.48 g-mole)
Gas residence time: 2.1 sec. (3.53 sec, based on total bed volume)
Percentage of bed conversion to $BaCO_3$: 97%
Methods of analysis: IR, GC and TCD (see above)

Figure 2:
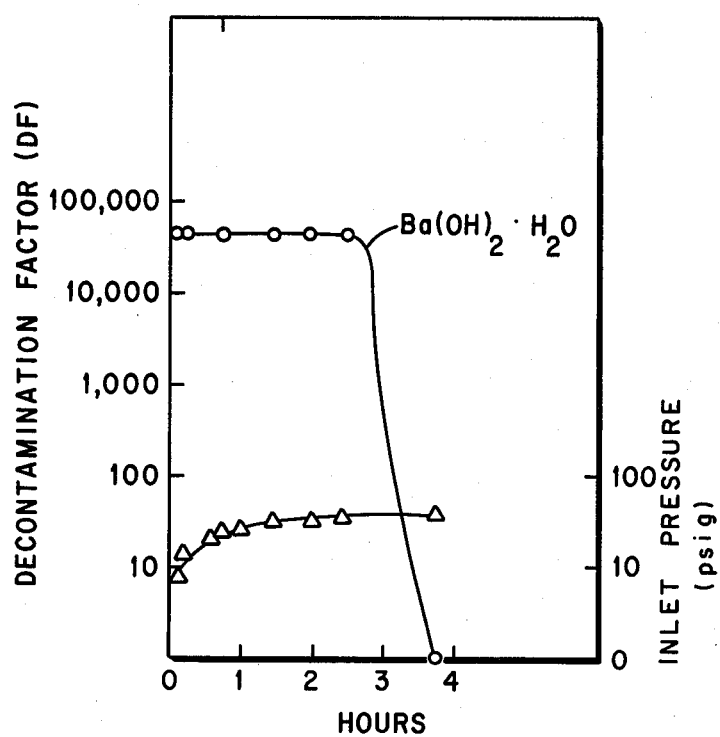
FIGS. 2-8 are $CO_2$-sorption profiles obtained in runs in apparatus of the kind illustrated in FIG. 1.

FIG. 2 depicts the $CO_2$-sorption profile for the run. It will be noted that decontamination factors of as much as $6 \times 10^4$ were obtained for 75% of the run. When complete bed conversion was approached, the decontamination factors decreased rapidly. As indicated in FIG. 2, the pressure at the inlet end of the bed gradually increased because of the increasing proportion of product $BaCO_3$ fines in the bed.

EXAMPLE 2 (Run TRIAD)

The following table summarizes an experiment comparing the $CO_2$-sorption properties of fixed beds composed, respectively, of $Ba(OH)_2 \cdot H_2O$; $Ba(OH)_2 \cdot 5H_2O$; and $Ba(OH)_2 \cdot 8H_2O$. The beds for each hydrate comprised 0.2 g-mole; in each instance the powder was a −5+20 mesh cut (Tyler). These runs were conducted in a fixed-bed system similar to that shown in FIG. 1.

| Bed dimensions (approximate) | Residence times | |
|---|---|---|
| | Total Bed | 0.6 voids |
| Monohydrate - 2.5 × 7.5 cm | 2.96 sec. | 1.78 sec. |
| Pentahydrate - 2.5 × 10.5 cm | 4.14 sec. | 2.5 sec. |
| Octahydrate - 2.5 × 12.6 cm | 5.00 sec. | 3.0 sec. |

Feed gas: water-saturated air; total $CO_2$ content 4.78%
Temperature of feed gas: 20° C.
Average flow rate: 0.76 l/min.
Final bed conversions: $Ba(OH)_2 \cdot _2O$ 84.8%
  $Ba(OH)_2 \cdot 5H_2O$ 41.7%
  $Ba(OH)_2 \cdot 8H_2O$ 3.5%

(Detection methods: monohydrate, GC and TCD or GC and FID; pentahydrate GC and TCD; octahydrate, GC and TCD)

Figure 3:
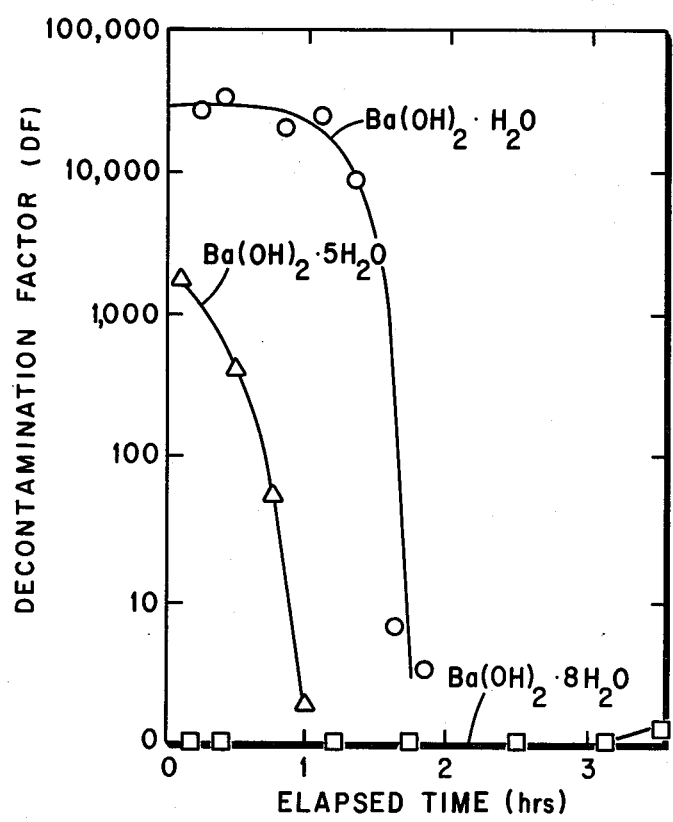

The $CO_2$-sorption profiles are shown in FIG. 3. The superiority of the monohydrate bed is evident. The octahydrate run was conducted for over six hours, but the highest decontamination factor obtained with this hydrate was ~1.2.

EXAMPLE 3 (Run 04257824)

Figure 4:
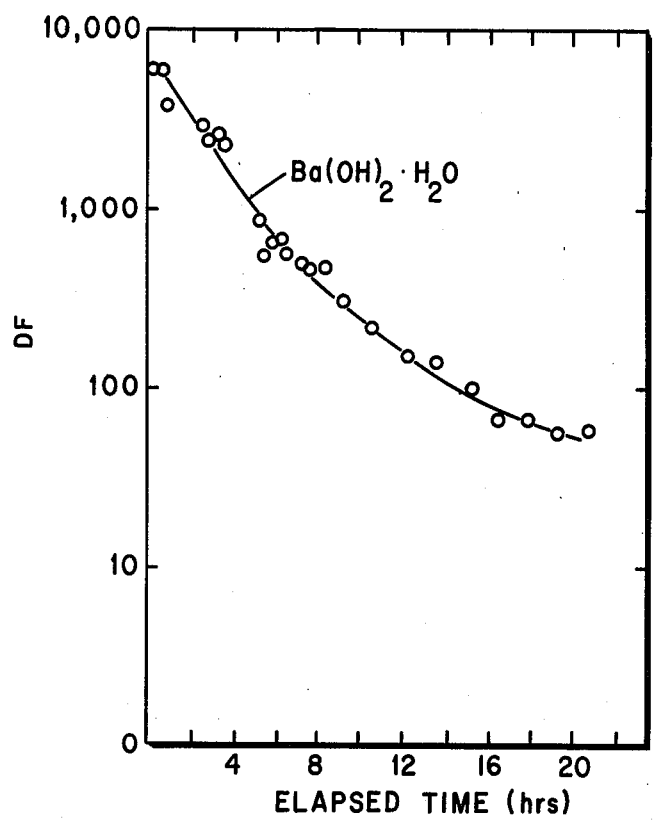

FIG. 4 is the $CO_2$-sorption profile for a fixed-bed run conducted with $Ba(OH)_2 \cdot H_2O$. The system was similar to that shown in FIG. 1. The run is summarized below.

Feed gas: water-saturated air containing 0.033% $CO_2$
Average flow rate of feed gas: 6.5 l/min
Feed gas temperature: ambient (20° C.)
Bed material: $Ba(OH)_2 \cdot H_2O$ [source 2; −5+20 mesh; 0.17 g-mole] and sea sand (1:1 by volume)
Bed dimensions: 2.5×12.6 cm (total bed volume with sand, ~64 cm³)
Gas residence time based on total bed volume: 0.59 sec.

Residence time based on 0.6 void volume: 0.35 sec.
Final bed conversion: 68%
Method of analysis: GC and FID or TCD.

As indicated, in this run a particulate non-reactive material (sea sand) was incorporated in the bed. This had the beneficial effects of increasing the overall porosity of the bed during conversion from $Ba(OH)_2 \cdot H_2O$ to the considerably finer $BaCO_3$ product. Thus, the run could be completed with a minimized rise in pressure drop across the bed; also note Example 4, below.

EXAMPLE 4 (Run 03067818)

Figure 5:
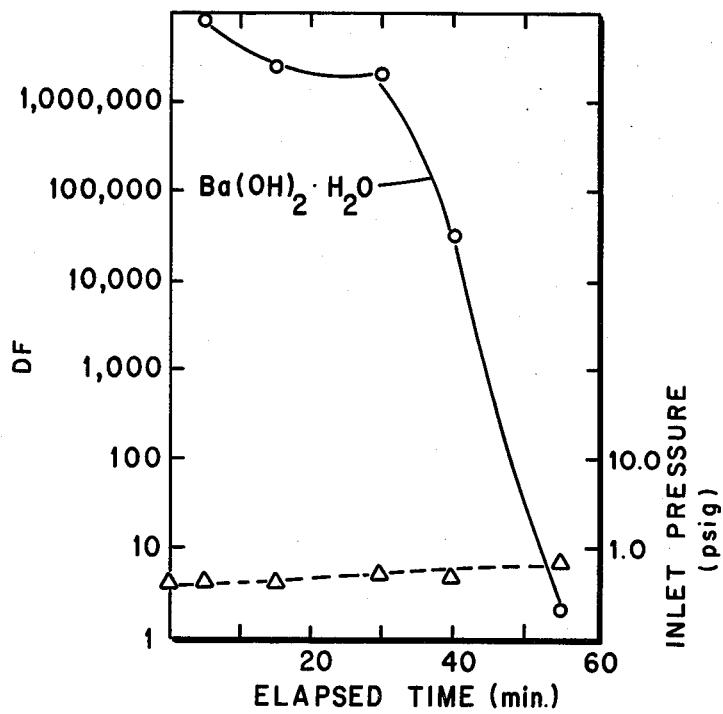

FIG. 5 is a $CO_2$-sorption profile for another fixed-bed run, summarized below.

Feed gas: water-saturated air; $CO_2$ content, 88.35%
Average flow rate of feed gas: 0.23 l/min.
Temperature of feed gas: 20° C.
Bed dimensions: 2.5×28.5 cm
Bed material: $Ba(OH)_2 \cdot H_2O$ (source 2; −5+20 mesh; 0.38 g-mole) and sea sand (1:1 by volume)
Gas residence time based on total bed volume: 37 sec; based on 0.6 void volume, 22.5 sec
Final bed conversion: 92.6%
Method of detection: GC and FID or GC and TCD In this experiment, the inert bed diluent (sea sand) had at least two beneficial effects: it maintained bed porosity throughout the run and it absorbed and transmitted heat, thus minimizing or preventing melting of the hydrate. In contrast to some of the other runs conducted with $CO_2$ concentrations above 80% and without a bed diluent, the product $BaCO_3$ was a free-flowing solid. As indicated, the increase in inlet pressure throughout the run was relatively small, presumably because of the presence of the diluent.

EXAMPLE 5

The following is a summary of two runs conducted in the fluidized-bed system shown in FIG. 1 to determine the effect of humidity on the final extent of bed conversion to the carbonate.

Figure 6:
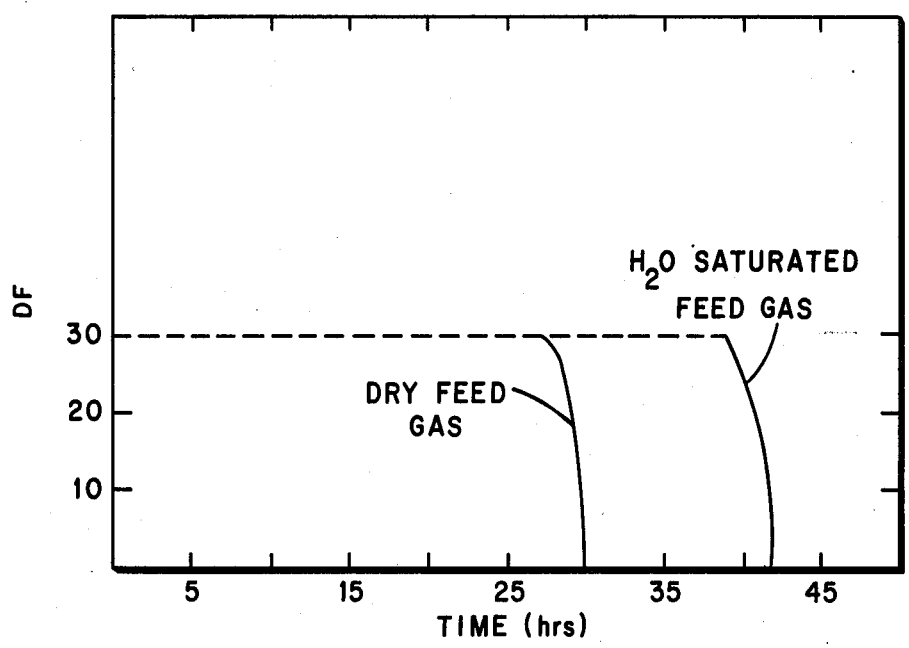

Feed gas: 0.033% $CO_2$-air; one run with no $H_2O$, one with feed at 100% relative humidity
Average flow rate of feed gas: 12 slm (21° C., 1 atm.), both runs
Temperature of feed gas: ambient (21° C.)
Bed material: $Ba(OH)_2 \cdot 8H_2O$ (source 1; pre-dried in argon; 100 to 200 mesh cut; 190 g—0.60 g-mole)
Tapered bed dimensions: angle of taper. 1.5°; height, 35 cm; small diameter, 2.54 cm; large diameter 4.3 cm
Bed length when fluidized: Increased from 35 cm. to 55 cm; large diameter, 5.2 cm.
Gas residence time: ~0.33 sec.
Final bed conversions: shown in FIG. 6
Method of analysis: GC and TCD FIG. 6 shows the $CO_2$-sorption profiles for the two runs. Clearly, saturation of feed gas significantly increased the extent to bed conversion. The lower $CO_2$ detection limit was 10 ppm; at that time, DF=30.

EXAMPLE 6

Figure 7:
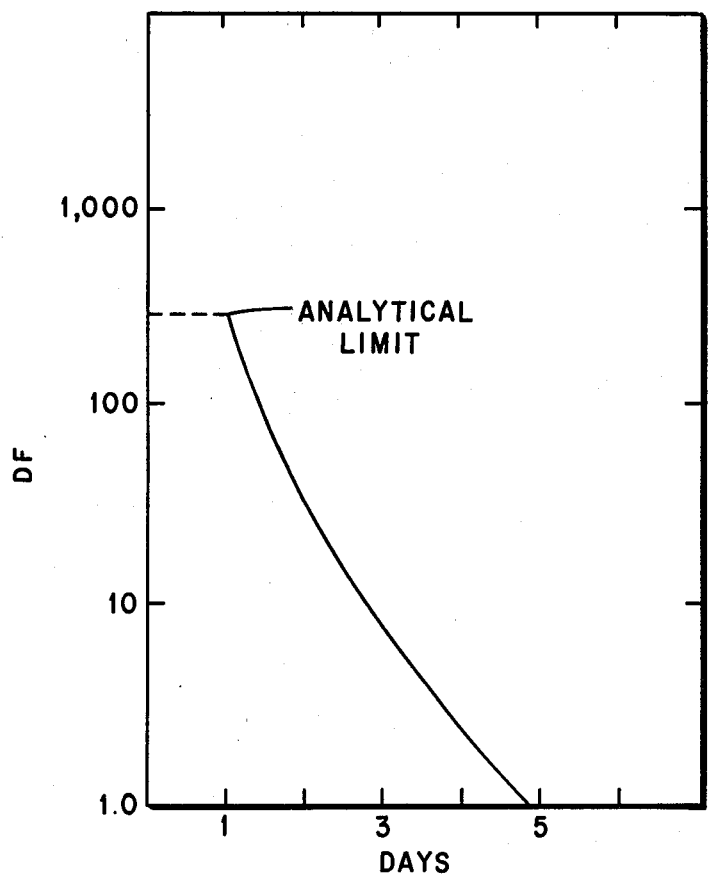

FIG. 7 is a sorption profile for another experiment conducted in the fluidized-bed system shown in FIG. 1. The run is summarized below.

Feed gas: 0.33% $CO_2$-air; water-saturated
Average flow rate of feed gas: 30 slm
Minimum velocity for fluidization: 25 slm
Temperature of feed gas: 21° C.
Bed material: $Ba(OH)_2 \cdot H_2O$ (source 2; 25-50 mesh cut; 500 g; 2.63 g-mole)
Bed dimension (bed at rest): height, ~50 cm; small diameter 2.54 cm; large diameter, 4.9 cm
Bed dimensions when fluidized: height, 63 to 75 cm; tapering from 6.2 cm ID to 2.54 cm ID.
Gas residence time: 0.35 sec
Final bed conversion: 99%
Method of analysis: IR, GC and TCD

EXAMPLE 7

Figure 8:
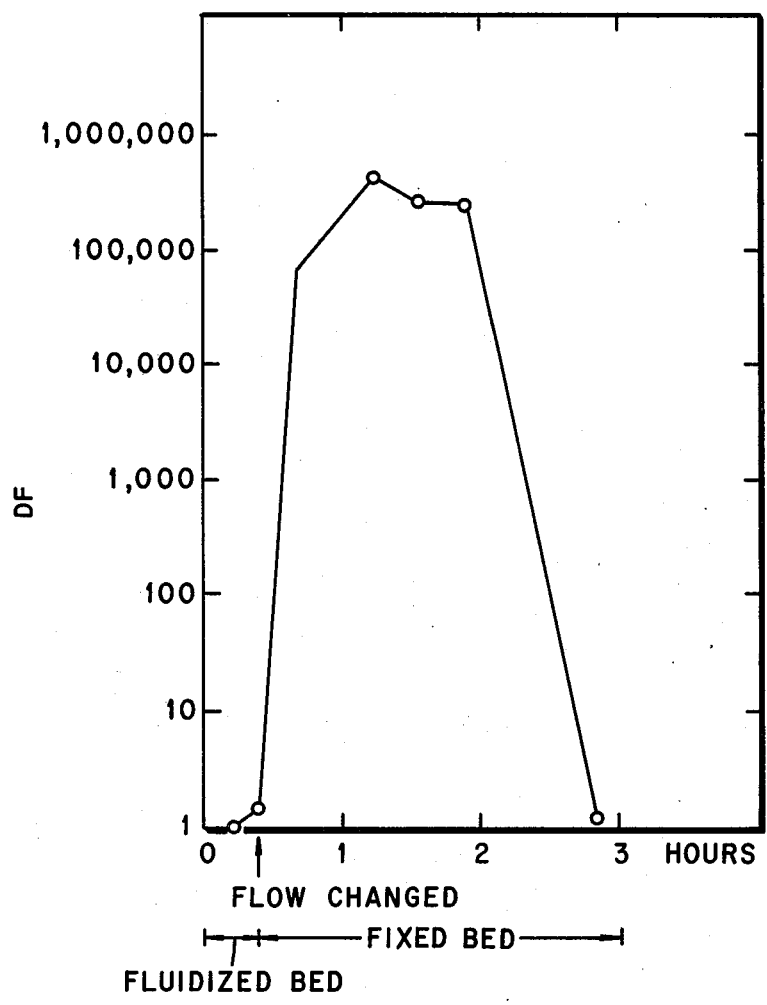

FIG. 8 is a $CO_2$-sorption profile for a run in which the sorption bed in contactor 22 consisted of 502 g of $Ba(OH)_2 \cdot H_2O$ and the feed gas was air containing 4.78% $CO_2$. The initial portion of the run was conducted at a gas flow rate of ~18 slm, effecting fluidization of the bed. In this mode of operation, relatively small DF's were obtained, although more than 50% of the $CO_2$ was removed from the feed gas. The flow then was reduced to ~4 slm, resulting in operation in the fixed-bed mode. In this mode, where the bed-residence time was longer, acceptable DF's were obtained. The final bed conversion efficiency was 91.7%. The effluent was analyzed by GC and TCD or IR.

The mechanism for the sorption of $CO_2$ by the hydrated barium hydroxides is not yet well understood, and we do not wish to be bound by any particular theory regarding the same. On the basis of many sorption runs similar to those described above, it is our opinion that the relatively high reactivity of the monohydrate is due to its more open structure, which permits ready diffusion of the $CO_2$ to the reaction sites.

We have found that for both packed-bed and fluidized-bed operation with dilute $CO_2$-air streams, the extent of bed conversion is strongly dependent on the relative humidity of the feed stream. Thus, the decontamination factor also is dependent on the relative humidity, because a high decontamination factor can be maintained for extended periods (periods corresponding to a bed conversion of >50%) only in the presence of a continuous input of water vapor to the reaction zone. That is, the water vapor extends the useful life of the reactant bed, an important advantage with respect to making the process both efficient and inexpensive. However, as shown in FIG. 6, we have found that for a high degree of hydration—e.g., for beds of $Ba(OH)_2 \cdot 8H_2O$—it is possible for a limited time to obtain decontamination factors with dry feed gas which are comparable to those obtained for feed gases containing up to 100% relative humidity. This effect is believed due to release of the bound waters of hydration.

Referring generally to the fixation of $CO_2$ by fluidized beds of barium hydroxide hydrates, our experiments indicate the following: (1) bed conversion is directly proportional to relative humidity (whether present in the original $CO_2$-containing gas or added thereto as a reactant); (2) bed conversion is directly proportional to particle size; (3) decontamination factors for $CO_2$ are proportional to the inlet $CO_2$ concentration in the feed gas; (4) when the bed material contains several waters of hydration (e.g., five or more), high decontamination factors can be obtained for a relatively short period of time with very low relative humidity feed streams.

Referring generally to fixed-bed operation, we have found that here, too, the degree of bed conversion to the carbonate increases with the amount of water vapor present. The following comparative runs illustrate the dependency of bed conversion on the relative humidity of the feed streams, for a fixed bed of the monohydrate.

|  | Case 1 | Case 2 |
| --- | --- | --- |
| Feed gas | 0.033% $CO_2$-air | 0.033% $CO_2$-air |
| Water vapor | <1% R.H.[a] | ~100% R.H. |
| Average flow rate of gas | ~1.0 slm | ~1.0 slm |
| Temperature of feed | ~21° C. | ~21° C. |
| Fixed bed material | $Ba(OH)_2 \cdot H_2O$ | $Ba(OH)_2 \cdot H_2O$ |
| Bed dimensions | 2.5 × 7.0 cm | 2.5 × 7.0 cm |
| Gas residence time | 1.36 sec | 1.36 sec |
| DF | 1.0 | >$10^3$ |
| Bed conversion | 0.0 | >80% |

[a] R.H. = relative humidity. Note that at 21° C., 100% R.H. gives a water mole fraction of ~0.026. One percent R.H. gives a water mole fraction of ~0.00026.

In general, we prefer to conduct the $CO_2$-absorption in the presence of water vapor in the amount required to saturate the feed gas. Where the feed gas contains less than about 1% $CO_2$, however, good results can be obtained if the relative humidity exceeds about 10%. And where the $CO_2$ concentration is in the range of about 1-5%, good results can be obtained with relative humidities in the range of about 50-100%. When the feed stream is at 10-100% relative humidity, the monohydrate gives the best operation (high decontamination factors and bed conversion) for either fluidized or packed beds.

A feature of this invention is the maintenance of a selected relative humidity in the reaction zone, or bed. It will be understood that in some instances the water content of the original feed gas may be sufficient to meet this requirement, whereas in other instances water vapor must be added to the feed gas as required. As used herein, the phrases "continuously introducing water vapor to the bed" and "continuously maintaining the relative humidity of the off-gas" include both of these modes of operation. An important advantage of our process is that it can be conducted effectively at ambient temperature (e.g., 20° C). If desired, however, the process may be conducted at any temperature in the range of from ambient to the melting point of the hydrate—e.g., 105° C. for the monohydrate and 80° C. for the octahydrate.

Our method is well suited for various industrial applications, since it is characterized by rapid reaction rates over a very wide range of $CO_2$ concentrations, high decontamination factors, and high capacity for $CO_2$. The method is especially attractive for the immobilization of radioactive carbon dioxide because the carbon dioxide is removed to very low levels and is immobilized in barium carbonate—a compound well suited for long-term storage. As mentioned, where long-term storage is a consideration, it is important that a high percentage of the relatively soluble hydrated barium-hydroxide be converted to the highly insoluble carbonate. For such applications, we prefer to conduct the run until the bed conversion exceeds 75%. The used bed material may be stored in un-encapsulated form or it may be dispersed in any suitable storage medium such as a matrix of concrete. The selection of a suitable matrix material is well within the skill of the art. If a bed diluent is to be used and if the matrix is to be concrete, the diluent may be selected to serve as a constituent of the concrete.

Thus far, we have found that fluidized beds are more suitable than fixed beds for feed gases containing low concentrations of $CO_2$—i.e., for $CO_2$ concentrations below about 0.1%. As the $CO_2$ concentration approaches 1%, the fixed bed removes the $CO_2$ more effectively than the fluid bed. It appears that at concentrations above about 1%, the gas residence time in the fluid bed is too short for quantitative removal.

The operating conditions employed in the foregoing examples are not necessarily the optimum. Using only routine experimentation, one skilled in the art will be able to scale the process for a given $CO_2$-removal application. Referring to Example 1, where the bed comprised 1.48 g-moles of the monohydrate, the concentration of $CO_2$ in the effluent was maintained below 1.0 ppm (corresponding in this instance to 1.0 ppb $^{14}CO_2$) until complete conversion of the bed was approached. We believe the method to be effective over a wide range of bed sizes corresponding to gas-residence times in the range of from about 0.1 to 100 seconds.

The foregoing examples have been presented for the purpose of illustration only, and it will be apparent to those versed in the art that various changes may be made within the scope of the invention as set forth in the accompanying claims. For instance, it may be found advantageous to connect a plurality of our beds in parallel, for simultaneous or staggered use. As indicated, the beds may be of the fixed or fluidized types, and may be designed and operated in accordance with principles well known in the art. If desired, the beds may contain any suitable particulate diluent which is thermally stable and chemically inert, to increase the porosity of the bed and improve heat transfer. The diluent may, for example, be sand, ceramic, or fly ash. Alternatively, the bed material may be pelletized and may consist, for example, of pellets having a diameter of $\frac{1}{8}$" or 1/16". When our process is employed for the immobilization of radioactive species, we select the process parameters to effect conversion of at least 75% of the barium hydroxide hydrate to the carbonate.

In the foregoing examples, the feed streams mainly comprised carbon dioxide, oxygen, and nitrogen. Given the teachings herein, one versed in the art can determine the applicability of this method to other feed-gas streams by means of merely routine experimentation. The method can, for example, be employed to remove non-radioactive carbon dioxide from streams mainly comprising helium (to provide a high-purity product). The method also is applicable to the scrubbing of $NO_x$ or radioactive iodine from nuclear-plant off-gas streams. Where iodine is so removed, the product is barium iodate, which is known to be well suited for the long-term immobilization of the iodine.

What is claimed is:

1. In the operation of a nuclear facility which generates an off-gas including carbon dioxide containing fission-product radioactive carbon as a constituent, the method of removing said carbon dioxide and immobilizing the same in dry, stable, and substantially water-insoluble form, said method comprising
    (a) providing a bed of particulate barium hydroxide monohydrate, and
    (b) directing said off-gas through said bed while introducing water vapor to said bed in an amount effecting conversion of at least 75% of said bed to barium carbonate.

2. The process of claim 1 wherein said off-gas and said bed are contacted at a temperature in the range of from ambient temperature to about 105° C.

3. The method of claim 1 wherein said water vapor is present in the amount of from 10 to 100% of the saturation value for said off-gas.

4. The process of claim 1 wherein the concentration of carbon dioxide in said off-gas is below 1% and wherein said off-gas is passed through said bed at a flow rate sufficient to fluidize the same.

5. In the operation of a nuclear facility which generates an off-gas including carbon dioxide containing fission-product radioactive carbon as a constituent, the method of disposing of said carbon dioxide which comprises:
   (a) providing a bed of particulate barium hydroxide monohydrate,
   (b) directing said off-gas through said bed while introducing water vapor to said bed in an amount effecting conversion of at least 90% of said bed to barium carbonate,
   (c) encapsulating the resulting barium carbonate in a matrix material for storage, and
   (d) storing the encapsulated barium carbonate.

6. In the operation of an industrial facility which generates an off-gas stream containing carbon dioxide, the method of removing said carbon dioxide comprising:
   (a) providing a bed of particulate barium hydroxide monohydrate,
   (b) directing said stream through said bed while continuously introducing water vapor to said bed in an amount corresponding to from 10 to 100% of the saturation-value for said stream to effect conversion of said bed to barium carbonate, and
   (c) continuously withdrawing the resulting carbon-dioxide-depleted stream from said bed.

7. The process of claim 6 wherein said stream and said bed are contacted at ambient temperature.

8. The process of claim 6 wherein said stream is passed through said bed at a flow rate fluidizing said bed.

9. The process of claim 6 wherein the carbon dioxide content of said feed stream is below 1%.

10. The process of claim 6 wherein said feed stream also contains iodine.

* * * * *

UNITED STATES PATENT OFFICE
CERTIFICATE OF CORRECTION

Patent No. 4,162,298         Dated July 24, 1979

Inventor(s) David W. Holladay et al.

It is certified that error appears in the above-identified patent and that said Letters Patent are hereby corrected as shown below:

Column 10, line 19 for "6" read ---8---

Signed and Sealed this

First Day of July 1980

[SEAL]

Attest:

SIDNEY A. DIAMOND

Attesting Officer    Commissioner of Patents and Trademarks